(12) United States Patent
Hayashi et al.

(10) Patent No.: US 11,942,003 B2
(45) Date of Patent: Mar. 26, 2024

(54) VIDEO IMAGE DISPLAY SYSTEM

(71) Applicant: AGC Inc., Tokyo (JP)

(72) Inventors: Hideaki Hayashi, Tokyo (JP); Yoshinori Iguchi, Tokyo (JP); Yukihiro Tao, Tokyo (JP)

(73) Assignee: AGC Inc., Tokyo (JP)

( * ) Notice: Subject to any disclaimer, the term of this patent is extended or adjusted under 35 U.S.C. 154(b) by 81 days.

(21) Appl. No.: 17/648,715

(22) Filed: Jan. 24, 2022

(65) Prior Publication Data

US 2022/0171273 A1    Jun. 2, 2022

Related U.S. Application Data

(63) Continuation of application No. PCT/JP2020/032230, filed on Aug. 26, 2020.

(30) Foreign Application Priority Data

Aug. 29, 2019  (JP) ................................ 2019-156656

(51) Int. Cl.
*G09F 19/18* (2006.01)
*B60K 35/00* (2006.01)
(Continued)

(52) U.S. Cl.
CPC .............. *G09F 19/18* (2013.01); *B60K 35/00* (2013.01); *G01S 19/42* (2013.01); *G01S 19/52* (2013.01);
(Continued)

(58) Field of Classification Search
CPC ................................. G09F 19/18; G03B 21/62
See application file for complete search history.

(56) References Cited

U.S. PATENT DOCUMENTS 5,570,138 A * 10/1996 Baron ..................... G09F 19/18
                                                                   359/449
6,577,355 B1 * 6/2003 Yaniv ..................... G03B 21/10
                                                                   349/16
(Continued)

FOREIGN PATENT DOCUMENTS

| JP | 2001-100318 A | 4/2001 |
| JP | 2006-113230 A | 4/2006 |
| JP | 2006-293250 A | 10/2006 |

OTHER PUBLICATIONS

ANSI/INFOCOMM 3M-2011 "Projected Image System Contrast Ratio" (Year: 2011).*

(Continued)

*Primary Examiner* — Leon W Rhodes, Jr.
(74) *Attorney, Agent, or Firm* — Oblon, McClelland, Maier & Neustadt, L.L.P.

(57) ABSTRACT

The visibility of the external scene from the inside of the transmissive transparent screen when the video image is not displayed and the visibility of the video image from the outside when the video image is displayed are satisfied.

In a video image display system comprising a projection device 100 and a transmissive transparent screen 1 having a first surface and a second surface on the opposite side of the first surface, having a visible light transmittance of at least 5[%], and displaying video images projected from the projection device 100 installed on the first surface side, as video images visible to an observer on the second surface side, the following formula 1 is satisfied:

$$-1.5 \leq \ln(((B/A)/I) \times G) \leq 3.9 \qquad \text{Formula 1}$$

in the formula 1, A is the projection area [m²] of the projection device 100, B is the luminous flux [lm] projected onto A by the projection device 100, I is the (Continued)

ambient illuminance [lx] at the side of the second surface, and G is the screen gain of the transparent screen 1.

17 Claims, 9 Drawing Sheets

(51) Int. Cl.
*G01S 19/42* (2010.01)
*G01S 19/52* (2010.01)
*G03B 21/62* (2014.01)
*H04N 9/31* (2006.01)

(52) U.S. Cl.
CPC .............. *G03B 21/62* (2013.01); *H04N 9/312* (2013.01); *H04N 9/3155* (2013.01); *B60K 2370/152* (2019.05)

(56) References Cited

U.S. PATENT DOCUMENTS

| | | | | |
|---|---|---|---|---|
| 7,595,930 | B2* | 9/2009 | Adams | G03B 21/58 |
| | | | | 359/449 |
| 9,986,195 | B2* | 5/2018 | Tanaka | H04N 9/3191 |
| 11,618,242 | B2* | 4/2023 | Ladewski | G09F 19/18 |
| | | | | 428/437 |
| 2013/0246181 | A1* | 9/2013 | Lobsenz | G06Q 30/0265 |
| | | | | 705/14.62 |
| 2015/0095124 | A1* | 4/2015 | Felt | G06Q 30/0259 |
| | | | | 705/14.57 |
| 2018/0045957 | A1* | 2/2018 | Yamaki | H04N 5/74 |
| 2020/0223191 | A1 | 7/2020 | Ladewski et al. | |

OTHER PUBLICATIONS

International Search Report dated Sep. 29, 2020 in PCT/JP2020/032230, filed on Aug. 26, 2020 therein, 2 pages

* cited by examiner

Fig. 2A

Ex. 1 First transparent screen

| | | (1) | (2) | (3) | (4) | (5) | (6) | (7) | (8) | (9) | (10) | (11) | (12) | (13) | (14) |
|---|---|---|---|---|---|---|---|---|---|---|---|---|---|---|---|
| Transparent screen | Screen gain G | 0.13 | 0.13 | 0.13 | 0.13 | 0.13 | 0.13 | 0.13 | 0.13 | 0.13 | 0.13 | 0.13 | 0.13 | 0.13 | 0.13 |
| | Haze Hz [%] | 20 | 20 | 20 | 20 | 20 | 20 | 20 | 20 | 20 | 20 | 20 | 20 | 20 | 20 |
| | Visible light transmittance [%] | 58 | 58 | 58 | 58 | 58 | 58 | 58 | 58 | 58 | 58 | 58 | 58 | 58 | 58 |
| Projector | Luminous flux B [lm] projected onto A | 40 | 280 | 770 | 1010 | 1500 | 1980 | 2950 | 40 | 280 | 770 | 1010 | 1500 | 1980 | 2950 |
| | Projection area A [m²] | 0.059 | 0.059 | 0.059 | 0.059 | 0.059 | 0.059 | 0.059 | 0.059 | 0.059 | 0.059 | 0.059 | 0.059 | 0.059 | 0.059 |
| Vehicle external environment | Vehicle external illuminance I [lx] | 8000 | 8000 | 8000 | 9000 | 9000 | 9000 | 8000 | 20 | 20 | 20 | 20 | 20 | 20 | 20 |
| Visibility parameter | $\ln(((B/A)/I) \times G)$ | -4.51 | -2.56 | -1.55 | -1.40 | -1.00 | -0.72 | -0.21 | 1.48 | 3.43 | 4.44 | 4.71 | 5.11 | 5.39 | 5.78 |
| Evaluation items | Halation when observed from outside the car | No (○) | No (○) | No (○) | No (○) | No (○) | No (○) | No (○) | No (○) | No (○) | Yes (×) | Yes (×) | Yes (×) | Yes (×) | Yes (×) |
| | Video image visibility from outside the car | × | × | × | ○ | ○ | ○ | ○ | ○ | ○ | ○ | ○ | ○ | ○ | ○ |
| | Visibility of scene from inside the car | ○ | ○ | ○ | ○ | ○ | ○ | ○ | ○ | ○ | ○ | ○ | ○ | ○ | ○ |

Fig. 2B
Ex. 2 Second transparent screen

|  |  | (1) | (2) | (3) | (4) | (5) | (6) | (7) | (8) | (9) | (10) | (11) | (12) | (13) | (14) |
|---|---|---|---|---|---|---|---|---|---|---|---|---|---|---|---|
| Transparent screen | Screen gain G | 0.06 | 0.06 | 0.06 | 0.06 | 0.06 | 0.06 | 0.06 | 0.06 | 0.06 | 0.06 | 0.06 | 0.06 | 0.06 | 0.06 |
|  | Haze Hz [%] | 20 | 20 | 20 | 20 | 20 | 20 | 20 | 20 | 20 | 20 | 20 | 20 | 20 | 20 |
|  | Visible light transmittance [%] | 76 | 76 | 76 | 76 | 76 | 76 | 76 | 76 | 76 | 76 | 76 | 76 | 76 | 76 |
| Projector | Luminous flux B [lm] projected onto A | 40 | 280 | 770 | 1010 | 1500 | 1980 | 2950 | 40 | 280 | 770 | 1010 | 1500 | 1980 | 2950 |
|  | Projection area A [m²] | 0.059 | 0.059 | 0.059 | 0.059 | 0.059 | 0.059 | 0.059 | 0.059 | 0.059 | 0.059 | 0.059 | 0.059 | 0.059 | 0.059 |
| Vehicle external environment | Vehicle external illuminance I [lx] | 8000 | 7000 | 7000 | 8000 | 7000 | 7000 | 6000 | 20 | 20 | 20 | 20 | 20 | 20 | 20 |
| Visibility parameter | $\ln(((B/A)/I) \times G)$ | -5.28 | -3.20 | -2.19 | -2.05 | -1.52 | -1.25 | -0.69 | 0.71 | 2.66 | 3.67 | 3.94 | 4.33 | 4.61 | 5.01 |
| Evaluation items | Halation when observed from outside the car | No (○) | No (○) | No (○) | No (○) | No (○) | No (○) | No (○) | No (○) | No (○) | No (○) | Yes (×) | Yes (×) | Yes (×) | Yes (×) |
|  | Video image visibility from outside the car | × | × | × | × | × | ○ | ○ | ○ | ○ | ○ | ○ | ○ | ○ | ○ |
|  | Visibility of scene from inside the car | ○ | ○ | ○ | ○ | ○ | ○ | ○ | ○ | ○ | ○ | ○ | ○ | ○ | ○ |

Fig. 2C
Ex. 3 Third transparent screen

| | | (1) | (2) | (3) | (4) | (5) | (6) | (7) | (8) | (9) | (10) | (11) | (12) | (13) | (14) |
|---|---|---|---|---|---|---|---|---|---|---|---|---|---|---|---|
| Transparent screen | Screen gain G | 0.22 | 0.22 | 0.22 | 0.22 | 0.22 | 0.22 | 0.22 | 0.22 | 0.22 | 0.22 | 0.22 | 0.22 | 0.22 | 0.22 |
| | Haze Hz [%] | 48 | 48 | 48 | 48 | 48 | 48 | 48 | 48 | 48 | 48 | 48 | 48 | 48 | 48 |
| | Visible light transmittance [%] | 46 | 46 | 46 | 46 | 46 | 46 | 46 | 46 | 46 | 46 | 46 | 46 | 46 | 46 |
| Projector | Luminous flux B [lm] projected onto A | 40 | 280 | 770 | 1010 | 1500 | 1980 | 2950 | 40 | 280 | 770 | 1010 | 1500 | 1980 | 2950 |
| | Projection area A [m²] | 0.059 | 0.059 | 0.059 | 0.059 | 0.059 | 0.059 | 0.059 | 0.059 | 0.059 | 0.059 | 0.059 | 0.059 | 0.059 | 0.059 |
| Vehicle external environment | Vehicle external illuminance I [lx] | 12000 | 8000 | 9000 | 8000 | 9000 | 9000 | 9000 | 20 | 20 | 20 | 20 | 20 | 20 | 20 |
| Visibility parameter | ln(((B/A)/I)×G) | -4.39 | -2.04 | -1.14 | -0.75 | -0.48 | -0.20 | 0.20 | 2.01 | 3.96 | 4.97 | 5.24 | 5.63 | 5.91 | 6.31 |
| Evaluation items | Halation when observed from outside the car | No (○) | No (○) | No (○) | No (○) | No (○) | No (○) | No (○) | No (○) | Yes (×) | Yes (×) | Yes (×) | Yes (×) | Yes (×) | Yes (×) |
| | Video image visibility from outside the car | × | × | ○ | ○ | ○ | ○ | ○ | ○ | ○ | ○ | ○ | ○ | ○ | ○ |
| | Visibility of scene from inside the car | × | × | × | × | × | × | × | × | × | × | × | × | × | × |

VIDEO IMAGE DISPLAY SYSTEM

TECHNICAL FIELD

The present invention relates to a video image display system including a transmissive transparent screen.

BACKGROUND ART

There is an advertising method that utilizes the exterior surface, etc. of vehicles such as buses, trucks, and passenger cars (e.g. cabs, commercial vehicles, MaaS) (see, for example, Patent Document 1). Further, Patent Document 2 describes utilizing a window of a vehicle as an advertising medium.

In the video image display system described in Patent Document 2, a transmissive transparent screen is installed in the window of the vehicle (side window or rear window). A projection device installed inside the vehicle projects video images as advertisements on the transparent screen. The video images are visible from outside the vehicle.

An example of a transmissive transparent screen is described in Patent Document 3. As shown in FIG. 8, the transmissive transparent screen 70 described in Patent Document 3 has a transparent layer 701 and a light diffusion layer 702. Video image light L from a projection device (not shown) installed on the side of the transparent layer 701 is diffused by the light diffusion layer 702 to become transmitted light T and reflected light R. The observer 202 sees the video image with transmitted light T. The observer 201 can see the scene outside the transmissive transparent screen 70 (the side on which the observer 202 is present).

PRIOR ART DOCUMENTS

Patent Documents

Patent Document 1: JP-A-2006-293250
Patent Document 2: JP-A-2006-113230
Patent Document 3: JP-A-2001-100318

DISCLOSURE OF INVENTION

Technical Problem

In the video image display system described in Patent Document 2, the visible light transmittance (hereinafter simply referred to as transmittance) of the video image display transparent material (transmissive transparent screen) installed in the window is constant. In Patent Document 2, it is described that the transmittance is made to be at least 70%. In order to make the contents of advertisements easily visible from the outside, the transmittance may be made to be low. However, if the transmittance is lowered, the visibility of the scene outside the vehicle, etc., for the passengers of the vehicle will decrease. Further, in order to increase the visibility of the scene outside the vehicle for the passengers, the transmittance may be increased. However, if the transmittance is increased, it becomes difficult to see the contents of the advertisements from the outside.

That is, the video image display system described in Patent Document 2 has such a problem that it is impossible to satisfy both of making the contents of advertisements easily visible from the outside and increasing the visibility of the scene outside the vehicle for the passengers.

Further, as shown in FIG. 8, in a case where the amount of light reflected from the light diffusion layer 702 to the transparent layer 701 side is large, the amount of reflected light R' that is reflected on the surface of the projection device side of the transparent layer 701 and returns to the light diffusion layer 702 again will be large, and the reflected light R' will form an image in the light diffusion layer 702. The image caused by the reflected light R' becomes a blurred image and also becomes a noise (halation) to the regular video image, whereby the clarity of the regular video image will be lowered.

The haze of conventional transmissive transparent screens is not small, and, for example, it is more than 40%. In a case where a transmissive transparent screen with such a large haze is used, especially in dark situations such as at night, the light from the projection device will become relatively stronger, and the degree of halation will increase. That is, the visibility of the video image for the observer 202 will further be reduced. The purpose of the present invention is to provide a video image display system whereby halation is less likely to occur, and the visibility of video images from the outside is excellent, even when a transmissive transparent screen with a large degree of haze is used.

Further, if the haze of the transmissive transparent screen is large, the visibility of the external scene for the observer 201 will be reduced when the projection device is off (not projecting video image light). That is, it becomes difficult for the observer 201 to see the external scene (outside the transmissive transparent screen).

It is an object of the present invention to provide a video image display system that can satisfy both of the visibility of the external scene from the inside of the transmissive transparent screen when no video image is being displayed and the visibility of the video image from the outside when the video image is being displayed.

Solution to Problem

The video image display system according to the present invention is characterized in that it comprises a projection device, and a transmissive transparent screen having a first surface and a second surface on the opposite side of the first surface, having a visible light transmittance of at least 5 [%], and displaying video images projected from the projection device installed on the first surface side as video images visible to an observer on the second surface side, and it satisfies the following formula 1:

$$-1.5 < \ln(((B/A)/I) \times G) < 3.9 \quad \text{Formula 1}$$

in the formula 1, A is the projected area [m²] of the projection device, B is the luminous flux [lm] projected by the projection device onto A, I is the ambient illuminance [lx] at the side of the second surface, and G is the screen gain of the transparent screen.

It is preferred that the projection device has a luminance adjustment function.

It is preferred that the haze Hz of the transparent screen is at most 30 [%].

It is preferred that the screen gain G is at least 0.05.

It is preferred that the transparent screen is equipped with a light control layer in which the screen gain G and the haze Hz change between the first state in which light is scattered and the second state in which light is transmitted, and the screen gain G is at least 0.05 in the first state, and the haze Hz is at most 30 [%] in the second state.

It is preferred that the transparent screen comprises a first transparent substrate, a second transparent substrate and a light scattering sheet, wherein the first transparent substrate and the light scattering sheet are bonded by a first bonding layer, and the second transparent substrate and the light scattering sheet are bonded by a second bonding layer.

It is preferred that the first transparent substrate is provided on the first surface side, and the second transparent substrate is provided on the second surface side, and the color of the second transparent substrate is gray (uniform over the entire visible light (0.25≤x≤0.4, 0.25≤y≤0.4 in the xyY color system)).

It is preferred that the thickness of the transparent screen is at most 6 [mm].

It is preferred that the projection device is a projector and the projection distance is at most 100 [cm].

It is preferred that the weight of the projection device is at most 3 [kg].

The video image display system may be equipped with a sensor to detect the ambient illuminance I.

The system may be constructed so that the video projection starts when the ambient illuminance I becomes at most the predetermined value, and the video projection terminates when the ambient illuminance I exceeds the predetermined value.

It is preferred that the above predetermined value is from 1 to 500 [lx].

The transparent screen may be installed in a window of a vehicle.

The system may be constructed so that the video projection starts when the vehicle comes to a stop, and the video projection terminates when the vehicle's moving speed becomes to be at least a predetermined value.

It is preferred that the above predetermined value is from 1 to 30 [km/hr].

The video image display system may be further equipped with a cloud server that stores video data and a communication module that is connected to the projection device and transmits and receives video data from the cloud server, wherein the projection device and the communication module are electrically connected to each other, and the communication module acquires the video data from the cloud server at the timing when the power supply from the vehicle's accessory power source is started.

The communication module may be equipped with a GPS function, and constructed so that the video image data corresponding to each of the plurality of location ranges are stored in the cloud server, and the video image corresponding to the location information identified by the GPS function is displayed on the transparent screen.

Advantageous Effects of Invention

According to the present invention, it is possible to satisfy both of the visibility of the external scene from the inside of the transmissive transparent screen when no video image is displayed and the visibility of the video image from the outside when the video image is displayed. Further, even in a case where a transmissive transparent screen with a large haze is used, it is possible to provide a video image display system whereby halation is less likely to occur and the visibility of video images from the outside will be excellent.

BRIEF DESCRIPTION OF DRAWINGS

FIGS. 2A, 2B and 2C are descriptive diagrams showing the characteristics, measurement conditions, etc. of the transmissive transparent screens in Ex. 1 to Ex. 3.

DESCRIPTION OF EMBODIMENTS

In the following, embodiments of the present invention will be described with reference to the drawings. In the following description, the surface on the side where the projection device is installed in the transmissive transparent screen may be referred to as the "first surface P", and the surface on the opposite side of the first surface P may be referred to as the "second surface Q" (see FIG. 1). Further, in the following description, the following terms are used with the following meanings.

The transmittance is the ratio of the total transmitted light (sum of diffuse transmitted light and positive transmitted light) transmitted to the second surface Q (or the first surface P) to the incident light incident from the first surface P (or the second surface Q) at an angle of incidence of 0°. The reflectance is the sum of the positive reflectance and the diffuse reflectance. The transmittance and reflectance and the refractive index are the values when measured at room temperature by using the d-line (wavelength 589 nm) of a sodium lamp.

Haze Hz is the percentage of transmitted light that deviates from the incident light by more than 0.044 rad (2.5°) due to forward scattering among the transmitted light that is incident from the first surface P (or the second surface Q) of the transmissive transparent screen and transmitted to the second surface Q (or the first surface P). Specifically, it is the haze measured by the method described in JIS K 7136:2000 (ISO 14782:1999). The haze is measured at room temperature by using a CIE standard D65 light source as specified in ISO/CIE 10526.

The screen gain G is the ratio of the luminance of the reflected light on the screen to the luminance of the video image light projected on the screen. Specifically, it is the luminance value (relative value) of the reflected light of the video image light projected on the screen under the same conditions, when the luminance of the reflected light of the light irradiated on the perfect diffuser is 1.0.

Embodiment 1

Figure 1:
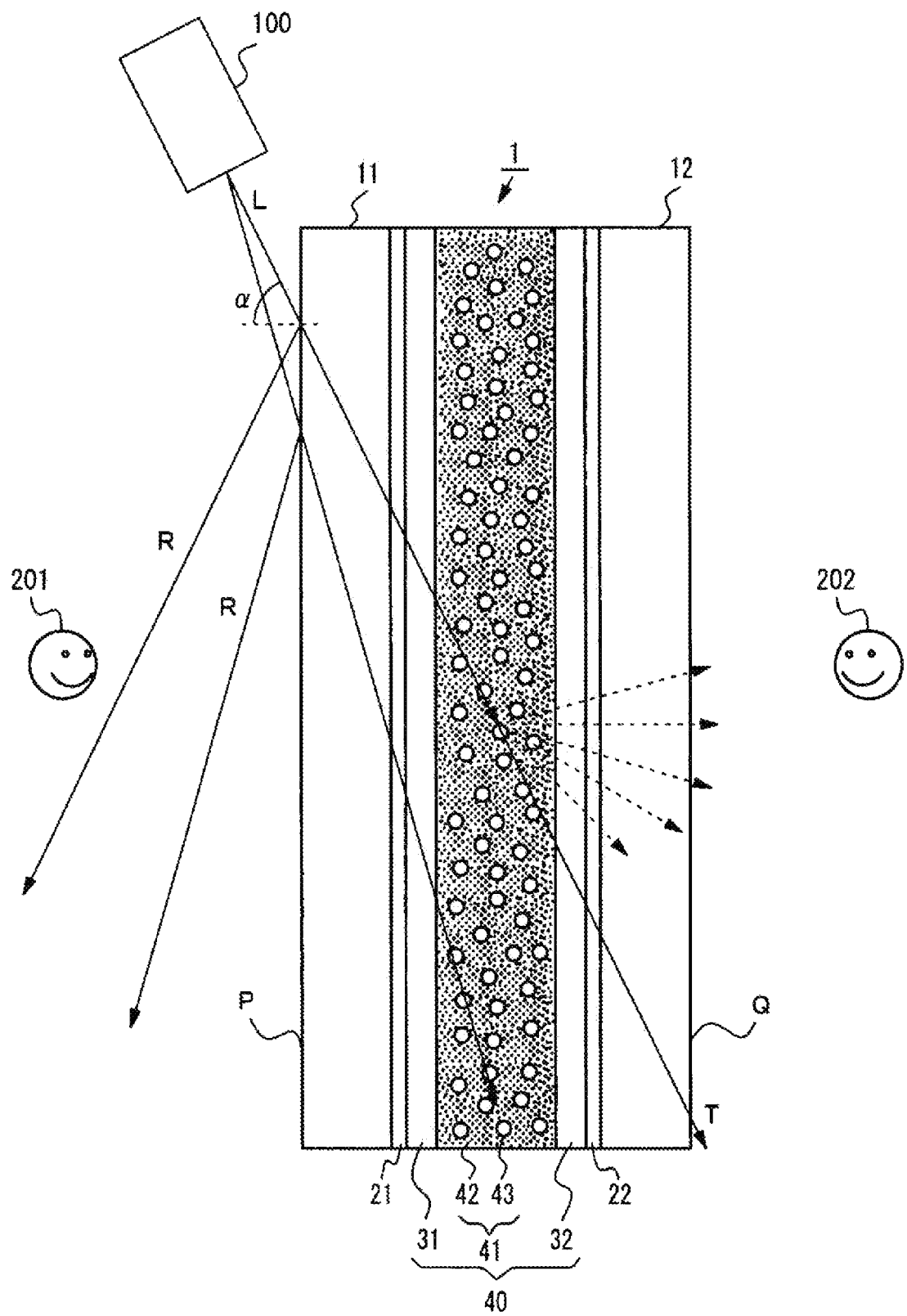
FIG. 1 is a construction view showing the video image display system including a transmissive transparent screen.

FIG. 1 is a construction view showing a video image display system in a first embodiment. The video image display system comprises a transmissive transparent screen 1 and a projection device 100 installed on the first surface P side.

The transmissive transparent screen 1 comprises a first transparent substrate 11, a second transparent substrate 12 and a light scattering sheet 40. The first transparent substrate 11 and the light scattering sheet 40 are bonded by a first bonding layer 21. The second transparent substrate 12 and the light scattering sheet 40 are bonded by a second bonding layer 22.

At the time when the transmissive transparent screen 1 is installed in a window of a vehicle, there is a possibility that the passenger may touch the transmissive transparent screen 1 or the window may be equipped with a lifting mechanism, but the light scattering sheet 40 is protected between the transparent substrate 11 and the transparent substrate 12, whereby high durability can be secured.

The transmissive transparent screen 1 transmits the scene on the first surface P side so as to be visible to the observer 202 on the second surface Q side. Further, the transmissive transparent screen 1 transmits the scene on the second surface Q side so as to be visible to the observer 201 on the first surface P side. Furthermore, the transmissive transparent screen 1 displays the video image light projected from the first surface P side so as to be visible as a video image to the observer on the second surface side.

In the following, the respective components constituting the transmissive transparent screen 1 will be described.
(Projection Device)

The projection device 100 may be any device that can project video image light L onto the transmissive transparent screen 1, and, as one example, is a projector. In a case where the projection device 100 is a projector, the projector is preferably a projector, of which the projection distance (the distance from the projector to the screen) is from about 5 to 100 cm. When the projection distance is at least 5 cm, it is possible to secure a sufficient projection size. When the projection distance is at most 100 cm, at the time when the light emitted from the projector is projected onto the transmissive transparent screen 1, it is possible to prevent part of the video image from being blocked by a passenger or loaded objects in the car. The projection distance is preferably from 10 to 80 cm.

By using the projector as described above, the reflected light R or the transmitted light T (see FIG. 1) becomes less likely to enter the eyes of the observer 201 or the observer 202, even at a place that is out of focus in the optical axis direction in the transmissive transparent screen 1. This is because the light near the center of the video image, where the density of light quantity becomes high, increases the emission angle of the reflected light R, which is directly reflected on the first surface P of the transmissive transparent screen 1, and the emission angle of the transmitted light T, which is transmitted through the transmissive transparent screen 1 without forming an image.

The projection device 100 is preferably installed on the first surface P side of the transmissive transparent screen 1 so that the angle α of incidence of the video image light to the first surface P of the transmissive transparent screen 1 at the closest part to the projection device 100 of the video image displayed on the transmissive transparent screen 1 becomes to be from 15 to 60°. When the angle α of incidence is at least 15°, the outgoing angle of the reflected light R that is directly reflected on the first surface P and the outgoing angle of the transmitted light T that is transmitted through the light scattering layer 41 without being imaged become larger, so that the reflected light R and the transmitted light T are less likely to enter the eyes of the observer 201 and the observer 202. When the angle α of incidence is at most 60°, it is possible to suppress the decrease in luminance in the transmissive transparent screen 1. That is, if the angle of incidence of the video image light L is small, scattered light that is scattered by the light scattering layer 41 and directed to the observer 202, will increase, whereby luminance becomes high. However, when the angle of incidence of the video image light L is large, the light will be scattered by the light scattering layer 41 and scattered light directed toward the observer 202 will be reduced, whereby luminance becomes low. The angle α of incidence is preferably from 20 to 50°, more preferably from 30 to 45°.

However, the installation position of the projection device 100 is not limited to the above preferred position.

The video image light L projected from the projection device 100 will not be seen by the observer 202 unless it is scattered in an angular direction away from the regular reflection, since the angle of incidence increases as it moves away from the projection device 100. Therefore, by making the amount of light closer to the projection device 100 smaller and the amount of light farther from the projection device 100 larger, it may be corrected so that the amount of light reaching the observer 202 becomes to have the same light quantity distribution as that of the original video image.

The angle of incidence of the video image light L to the first surface P of the transmissive transparent screen 1 at the center of the video image displayed on the transmissive transparent screen 1 may be at least 30°. When the angle of incidence is at least 30°, it will be difficult for an observer to see a wide area of light with high intensity that does not form a video image in the vicinity of the center of the video image displayed on the transmissive transparent screen 1. It is more preferred that the angle of incidence is at least 45°.

As the projection system of the projector, a DLP system, a transmissive LCD system or a reflective LCD system may be exemplified, but, the DLP system is preferred from the viewpoint of increasing luminance, resolution and contrast, respectively. As the light source for the projector, a high-pressure mercury lamp, LED or LD (laser diode) may be exemplified, but LED and LD are preferred from the viewpoint of making the projector to be smaller. As the method for luminance adjustment, controlling the output of the projector by PWM (Pulse Width Modulation) driving or PAM (Pulse Amplitude Modulation) driving, or controlling the amount of light by interposing an optical filter between the light source and the projection lens, may be mentioned.
(Transparent Substrate)

As the material for the first transparent substrate 11 and the second transparent substrate 12, it is possible to use glass, a transparent resin, etc. The material for the first transparent substrate 11 and the material for the second transparent substrate 12 may be the same or may be different.

As the glass to constitute the first transparent substrate 11 and the second transparent substrate 12, it is possible to use soda-lime glass, alkali-free glass, borosilicate glass, aluminosilicate glass, etc. At least one of the first transparent substrate 11 and the second transparent substrate 12 made of glass, may be subjected to chemical strengthening, physical strengthening, hard coating, etc. to improve the durability.

It is particularly preferred that, by lowering the visible light transmittance of the transparent substrate 12 and increasing the visible light transmittance of the transparent substrate 11, it is possible to satisfy both of the visibility of the scene outside the car for the observer 201 and the visibility for the observer 202 during image projection. As an example of the transparent substrate 12, privacy gray glass may be mentioned, and as an example of the transparent substrate 11, green glass may be mentioned. From the viewpoint of ensuring privacy, by making it difficult to see what is going on inside the car when looking at the car from outside, it is preferred to use privacy gray glass as the transparent substrate 12. In such a case, the visible light transmittance of the transmissive transparent screen is preferably at most 70%, more preferably at most 50%. Here, as for the color of the transparent substrate 12, it is preferred to use a gray color that uniformly attenuates light over the entire visible light to improve the contrast of the sight or projected image. As the preferred range, in the xyY color system, $0.25 \leq x \leq 0.4$ and $0.25 \leq y \leq 0.4$ are good, and $0.27 \leq x \leq 0.38$ and $0.27 \leq y \leq 0.38$ are preferred.

In a case where privacy gray glass is to be used, it is preferred that the glass contains one of Fe, Ti, Ce, Co, Se and Cr as a coloring component.

As the transparent resin to constitute the first transparent substrate 11 and the second transparent substrate 12, it is possible to use a cured product of a curable resin or a thermoplastic resin, but a thermoplastic resin is preferred. As the thermoplastic resin, it is possible to use a polycarbonate, a thermoplastic polyester (polyethylene terephthalate (hereinafter referred to as PET), polyethylene naphthalate, etc.), triacetyl cellulose, a cycloolefin polymer, a polymethyl methacrylate, etc. From the viewpoint of weather resistance and transparency, a polycarbonate, a thermoplastic polyester, or a cycloolefin polymer is preferred.

The first transparent substrate 11 and the second transparent substrate 12 are preferably transparent substrates without birefringence. The thickness of the first transparent substrate 11 and the second transparent substrate 12 may be such a thickness that the durability can be maintained as the substrate. For example, the thickness of the first transparent substrate 11 and the second transparent substrate 12 may be at least 0.01 mm, may be at least 0.05 mm, or may be at least 0.1 mm. Further, the thickness of the first transparent substrate 11 and the second transparent substrate 12, for example, may be at most 10 mm, may be at most 5 mm, may be at most 0.5 mm, may be at most 0.3 mm, or may be at most 0.15 mm.

The visible light positive reflectance of the first transparent substrate 11 and the second transparent substrate 12 is preferably at least 7% at the wavelength of from 380 to 780 nm, respectively, in order to obtain clear video images. Further, the surface roughness (Ra) of the surface of the first transparent substrate 11 (first surface P) and the surface of the second transparent substrate 12 (second surface Q) is preferably at most 1 μm.

Since vehicle windows are often shaped with curvature, it is preferred that the first transparent substrate 11 and the second transparent substrate 12 are materials that can be molded into a shape with curvature. In such a case, the first transparent substrate 11 and the second transparent substrate 12 are molded into a similar shape.

(Light Scattering Sheet)

The light scattering sheet 40 has a first transparent film 31, a second transparent film 32 and a light scattering layer 41. The light scattering layer 41 is provided between the first transparent film 31 and the second transparent film 32. The light scattering layer 41 has, as an example, a structure in which a light scattering material 43 and a light absorbing material (no symbol) are dispersed in a transparent resin 42.

The first transparent film 31 and the second transparent film 32 may be plastic films or thin glass films. The material for the first transparent film 31 and the material for the second transparent film 32 may be the same or may be different. As the transparent resin to constitute the first transparent film 31 and the second transparent film 32, it is possible to use a polycarbonate, a thermoplastic polyester, a triacetyl cellulose, a cycloolefin polymer, a polymethyl methacrylate, etc.

The thickness of the first transparent film 31 and the second transparent film 32 is preferably such a thickness that the roll-to-roll process may be applied, respectively. For example, from 0.01 to 0.5 mm is preferred, from 0.05 to 0.3 mm is more preferred, and at most 0.2 mm is further preferred.

As the transparent resin 42 in the light scattering layer 41, it is preferred that a cured product of a light-curable resin (a light-curable acrylic resin, a light-curable epoxy resin, etc.), a cured product of a thermosetting resin (a thermosetting acrylic resin, a thermosetting epoxy resin, etc.), or a thermoplastic resin (a polycarbonate, a thermoplastic polyester, a triacetyl cellulose, a cycloolefin polymer, a polymethyl methacrylate, etc. and, in addition, a polyolefin resin, a thermoplastic polyimide resin, a thermoplastic urethane, an ionomer resin, an ethylene-vinyl acetate copolymer (hereinafter referred to as EVA), a polyvinyl butyral (hereinafter referred to as PVB), ETFE, a thermoplastic silicone, etc.) is to be used. The yellow index of the transparent resin 42 is preferably at most 10, more preferably at most 5, from the viewpoint of maintaining transparency so that the function as a window in the transmissive transparent screen 1 is not impaired.

As the light scattering material 43 in the light scattering layer 41, it is possible to use fine particles of a high refractive index material such as titanium oxide (refractive index: from 2.5 to 2.7), zirconium oxide (refractive index: 2.4), aluminum oxide (refractive index: 1.76), zinc oxide (refractive index: 2.0), barium sulfate (refractive index: 1.64), zinc sulfide (refractive index: 2.2), etc. As the light scattering material 43, it is possible to use also fine particles of a low refractive index material such as porous silica (refractive index: at most 1.3) or hollow silica (refractive index: at most 1.3). As the light scattering material 43, it is also possible to use a resin material different in refractive index that has low compatibility with the transparent resin 42 or a crystallized resin material of at most 1 μm. The light scattering material 43 is a material that has the function of scattering light by having a refractive index different from the transparent resin 42 that serves as the binder. Since many resin materials have a refractive index of from 1.45 to 1.65, it is preferred that the refractive index differs from such resin materials by at least 0.15, more preferably by at least 0.25, further preferably by at least 0.5. As the light scattering material 43, titanium oxide or zirconium oxide is particularly preferred due to the high refractive index.

The proportion of the light scattering material 43 is preferably from 0.01 to 5 mass %, more preferably from 0.1 to 2 mass %, in 100 mass % of the light scattering layer 41. In order to adjust the total light transmittance of the light scattering layer 41 to be high, the proportion of the light scattering material 43 is preferably from 0.01 to 0.1 mass % in 100 mass % of the light scattering layer 41. For the same primary particle size, a larger amount of the light scattering material tends to result in a higher haze, but within this range, it is easy to adjust the haze within the desirable range.

As the light absorbing material, it is possible to use a carbon-type material (carbon black, nanodiamond, fullerenes, carbon nanotubes, carbon nanohorns, graphene, etc.), titanium black, black silica, and fine particle material containing primarily silver (e.g., silver nitride, sulfide, and oxide), etc.

From such a viewpoint that it is easy to obtain the desired balance of the haze and the total light transmittance as well as the transparency, the light absorbing material is preferably a carbon-type material and titanium black, more preferably carbon black and titanium black.

The light absorbing material can absorb a portion of the light that propagates as unwanted stray light in the transmissive transparent screen 1, whereby scattered light will be reduced. As a result, the phenomenon of cloudy white in the transmissive transparent screen 1 will be suppressed, the contrast of the video image will be improved, and the visibility of the video image will be enhanced. Further, the contrast of the scene that can be seen on the other side of the transmissive transparent screen 1 from the observer 201 side will also be improved, and the visibility of the scene will also be improved. The above effect is particularly noticeable when there is an environment of at least 100 lux due to external light in the line of sight of the observer 201.

It is preferred that the particle size of the light absorbing material be as small as possible. Specifically, in a case where the light absorbing material is fine particles, the average primary particle diameter of the fine particles is preferably from 1 to 200 nm, more preferably from 1 to 100 nm, further preferably from 1 to 60 nm. Further, the average primary particle diameter of the light absorbing material is preferably at most the average primary particle diameter of the light scattering material 43. The ratio of the average primary particle diameter of the light absorbing material to the average primary particle diameter of the light scattering material 43 (average primary particle diameter of the light absorbing material/average primary particle diameter of the light scattering material) is preferably 0.001 to 1. When the average primary particle diameter of the light absorbing material/average primary particle diameter of the light scattering material is from 0.001 to 1, light can be efficiently extracted in the forward scattering direction, and the screen gain can be increased while maintaining the transparency.

The thickness of the light scattering layer 41 is preferably from 1 to 200 μm. When the thickness of the light scattering layer 41 is at least 1 μm, the effect of light scattering can be fully demonstrated. When the thickness of the light scattering layer 41 is at most 200 μm, it will be easy to form the light scattering layer 41 by a roll-to-roll process. Further, in a case where the surface of the light scattering layer 41 is not the outermost layer of the transmissive transparent screen 1, the surface of the light scattering layer 41 may be flat or may have unevenness.

Further, the light scattering layer 41 is not limited to the light scattering layer 41 shown in FIG. 1, and may be one having a louver structure, consisting of a transparent layer and a plurality of light scattering sections arranged parallel to each other and at predetermined intervals inside the transparent layer. Further, the light scattering layer 41 may be one to be transmitted, deflected, or diffused by the volume hologram. The light scattering layer 41 may be one to be deflected, scattered, or diffused by a quinofoam hologram or other structure with an uneven surface.

Further, the light scattering sheet 40 may be formed by using polymer-dispersed liquid crystal (PDLC), in which liquid crystal is dispersed in a polymer. By disposing a pair of transparent conductive layers so as to sandwich the light scattering sheet 40 using PDLC and changing the voltage applied to the transparent conductive layers, it is possible to form a transmissive transparent screen 1 (hereinafter referred to as a PDLC-type transparent screen) capable of light control by switching between a transparent state and a scattering state. In the video image display system using the PDLC-type transparent screen, when the PDLC-type transparent screen is in the scattering state, the observer 202 can see the video image from outside the car by projection from the projection device, and when the PDLC-type transparent screen is in the transmission state, the observer 201 can see the scene outside the car. When the PDLC transparent screen is in the transparent state, the haze Hz is preferably a most 30%. Further, in the scattering state, the screen gain G is preferably at most 0.05.

(Bonding Layers)

The first bonding layer 21 and the second bonding layer 22 are layers formed from an adhesive or a binder. The adhesive or the binder may be in a liquid form containing a solvent.

As the adhesive, it is possible to use a thermosetting resin, a light-curable resin, a thermosetting resin. As the binder, it is possible to use an acrylic binder, a silicone binder, etc. The material of the first bonding layer 21 and the material of the second bonding layer 22 may be the same or may be different.

In a case where the first bonding layer 21 and the second bonding layer 22 are binders, the first bonding layer 21 is formed by crimping a layer of the binder between the first transparent substrate 11 and the first transparent film 31. Further, the second bonding layer 22 is formed by crimping a layer of the binder between the second transparent substrate 12 and the second transparent film 32. In a case where bonding is conducted by using a liquid containing a solvent, the solvent is removed for bonding or adhesion, after the liquid is applied to at least one of the bonding surfaces.

The first bonding layer 21 and/or the second bonding layer 22 may contain a coloring component. It is preferred that a light absorbing material is used as the coloring component, and it is particularly preferred that the second bonding layer 22 is one having a light absorbing material dispersed in it, whereby both of the visibility of the scene outside the car for the observer 201 and the visibility for the observer 202 during video image projection can be satisfied.

In a case where at most 5 mm is adopted as the preferred thickness of the first transparent substrate 11 and the second transparent substrate 12, at most 0.5 mm is adopted as the thickness of the first transparent film 31 and the second transparent film 32, and from 1 to 200 μm is adopted as the thickness of the light scattering layer 41, since the thickness of the first bonding layer 21 and the second bonding layer 22 may be deemed to be almost 0, the preferred thickness of the transmissive transparent screen 1 is at most 6 mm. By making the thickness of the transmissive transparent screen 1 to be at most 6 mm, it will be possible to replace the window of a vehicle without significant modification in a case where the transmissive transparent screen 1 is to be installed later on a window of a vehicle that does not have a transparent screen.

The video image projected on the transmissive transparent screen 1 may be a still image or a moving image. Further, as the types of the video images, it is possible to display advertisements as well as alerts to pedestrians and various information to drivers in ridesharing vehicles and to passengers using the ridesharing service, in the side window. Further, in the rear window, it is possible to display advertisements as well as alerts and various information to drivers of following vehicles.

Next, an example of the method for preparing a transmissive transparent screen 1 will be described.

The light scattering sheet 40 can be prepared, for example, as follows. A paste containing a light-curable resin, a light scattering material 43 and a light absorbing material is prepared. The paste is applied to the surface of the first transparent film 31, and the second transparent film 32 is overlaid on the paste.

The light scattering sheet 40 is obtainable by irradiating light (such as ultraviolet light) to the paste from the side of the first transparent film 31 or the side of the second transparent film 32 to cure the light-curable resin and form the light scattering layer 41 in which the light scattering material 43 and the light absorbing material are dispersed within the transparent resin 42.

Further, the light scattering sheet 40 may be prepared as follows. That is, a solution containing a solvent, a thermally bondable resin, a light scattering material 43 and a light absorbing material, is prepared. Here, the "thermally bondable resin" means a thermoplastic resin that softens at a relatively low temperature that exhibits bonding properties by thermal fusion. The light scattering sheet 40 is obtained by applying the solution to the surface of the first transparent film 31, drying it, and then overlaying the second transparent film 32, followed by heating and softening the thermally bondable resin and cooling it.

Further, the light scattering sheet 40 may be prepared as follows. That is, the light scattering layer 41 is formed by extruding the thermoplastic resin, the light scattering material 43 and the light absorbing material. For example, the light scattering sheet 40 is obtained by three-layer extrusion together with the thermoplastic resin for forming the first transparent film 31 and the second transparent film 32. The light scattering layer 41 may be formed by using the masterbatch method. That is, a masterbatch is prepared by melt-mixing the thermoplastic resin, the light scattering material 43 and the light absorbing material in advance. Then, at the time of extrusion molding, the masterbatch and the thermoplastic resin can be melt-mixed and extruded to form the light scattering layer 41.

The transmissive transparent screen 1 is prepared by laminating the light scattering sheet 40, the first transparent substrate 11 and the second transparent substrate 12 via the first bonding layer 21 and the second bonding layer 22. The bonding of the light scattering sheet 40 to the first transparent substrate 11 and the bonding of the light scattering sheet 40 to the second transparent substrate 12 may be conducted simultaneously or sequentially. For example, in a case where the first bonding layer 21 consists of a cured product of a curable resin, a curable resin layer is formed between the surface of the first transparent film 31, which is the bonding surface of the light scattering sheet 40, and the surface of the first transparent substrate 11, and the curable resin is cured for bonding. The same applies to the second bonding layer 22.

In a case where the first bonding layer 21 comprises a thermally bondable resin, a thermally bondable resin layer is formed between the surface of the first transparent film 31 of the light scattering sheet 40 and the surface of the first transparent substrate 11, and the thermally bondable resin layer is fused by heating and pressurizing, followed by cooling for bonding. As the thermally bondable resin, PVB or EVA may be exemplified. In a case where the first bonding layer 21 is a binder resin, a binder layer is formed between the surface of the first transparent film 31 in the light scattering sheet 40 and the surface of the first transparent substrate 11, and the binder layer is pressurized for bonding. The same applies to the second bonding layer 22.

EXAMPLES

Three types of transmissive transparent screens different in screen gains G and haze Hz (hereinafter referred to also as transparent screens) 1 were prepared, and by using a projector (manufactured by Casio, XJ-A257) as the projection device 100, the visibility parameters were measured under various conditions. Here, the luminance adjustment of the projection device 100 used in Examples was conducted by placing a variable ND filter (manufactured by KenkoTokina Corporation, Variable NDX) immediately after the outermost lens of the projector.

FIGS. 2A, 2B and 2C show the characteristics, measurement conditions, etc. of the three types of transparent screens 1 (the first transparent screen, the second transparent screen, and the third transparent screen). FIGS. 2A, 2B and 2C show the first transparent screen as Ex. 1, the second transparent screen as Ex. 2, and the third transparent screen as Ex. 3.

Further, the ambient illuminance I [lux: lx] was measured under the condition that no light was emitted from the projector, at a distance of 1 m from the second surface Q of the transparent screen 1, with the light detection part of the illuminance meter facing the zenith. (Ex. 1) By the following method, as shown in FIGS. 2A, 2B and 2C, a transparent screen 1 with a screen gain G of 0.13, a haze Hz of 20 [%] and a visible light transmittance of 58 [%], was prepared.

To 26 g (solid content: 2.6 g) of a 1-butanol solution (solid content: 10 mass %) of PVB (manufactured by Sekisui Chemical Co., Ltd., SP value: 23.0 (J/cm$^3$)$^{1/2}$, refractive index: 1.49), 0.08 g of light scattering fine particles (titanium oxide fine particles, average primary particle size: 0.2 μm, refractive index: 2.6) and 0.08 g (solid content: 0.024 g) of light absorbing material (butyl acetate dispersion of carbon black, solid content: 30 mass %, average primary particle diameter of carbon black: 30 nm) were added, followed by kneading for 10 minutes while degassing to prepare a paste.

A light scattering sheet was obtained by applying the paste obtained above to the surface of a transparent PET film (manufactured by Toyobo Co., Ltd., Cosmoshine (registered trademark) A4300, thickness: 125 μm) and drying it to form a light scattering layer with a thickness of 20 μm.

A soda-lime glass plate (made by Matsunami Glass Ind., Ltd., thickness: 3 mm, Ra: 0.005 μm, visible light positive reflectance: 8%), a PVB interlayer (thickness: 375 μm), the light scattering sheet obtained above, a PVB interlayer (thickness: 375 μm) and a soda-lime glass plate (thickness: 3 mm) were laminated in this order, and vacuum heating and compression were conducted to obtain a transparent screen 1.

Further, as the vehicle external environment, the measurement was conducted by varying the illuminance I outside the car from 20 to 9,000 [lx] (see (1) to (14) in Ex. 1 in FIGS. 2A, 2B and 2C). Then, the projection area A on the transparent screen 1 of the projector was fixed at 0.059 [m$^2$], and the luminous flux B projected by the projector onto A (hereinafter referred to as the "illuminance of the projector") was changed within the range of from 40 to 2,950 (lumens [lm]). The vehicle external illuminance I corresponds to the ambient illuminance at the side of the second surface Q.

The following formula 1 was used as the visibility parameter.

Visibility parameter: $\ln(((B/A)/I) \times G)$      Formula 1

The visibility parameter shown in the formula 1 (hereinafter simply referred to also as the "visibility parameter") substantially includes as parameters the degree of illuminance of the projector relative to the vehicle external illuminance, and the screen gain G of the transparent screen.

In Ex. 1, the haze Hz was relatively small, whereby the visibility from inside the car (the visibility of the scene, etc.

outside the car for the observer 201) was good in each of (1) to (14). In a case where the visibility parameter was at most 3.9 (in the case of (1) to (9)), halation was not noticeable. On the other hand, in (4) to (14), the value of the visibility parameter was at least −1.5, whereby the visibility from outside the car was high. By having the visibility parameter to be from −1.5 to 3.9 (in (4) to (9)), it was possible to obtain a video image display system in which halation was suppressed while the visibility from outside the car was maintained.

(Ex. 2) In the same manner as in Ex. 1 except that the concentrations of the light scattering fine particles and the light absorbing material in the above paste were changed, a transparent screen 1 having a screen gain G of 0.06, a haze Hz of 7 [%] and a visible light transmittance of 76 [%] as shown in FIGS. 2A, 2B and 2C was prepared. The assumed vehicle external environment is the same as in Ex. 1, except that the illuminance I outside the car was set to be from 20 to 8,000 [lx]. Further, the range of illuminance B of the projector, etc. are also the same as in the case of Ex. 1.

In Ex. 2, the haze Hz was relatively small, whereby the visibility from inside the car (the visibility of the scene, etc. outside the car for the observer 201) was good in each of (1) to (14). In a case where the visibility parameter was at most 3.9 (in the case of (1) to (10)), halation was not noticeable. On the other hand, in (6) to (14), the value of the visibility parameter was at least −1.5, whereby the visibility from outside the car was high. By having the visibility parameter of from −1.5 to 3.9 ((6) to (10)), it was possible to obtain a video image display system in which halation was suppressed while the visibility from outside the car was maintained.

(Ex. 3) In the same manner as in Ex. 1 except that the concentrations of the light scattering fine particles and the light absorbing material in the above paste were changed, a transparent screen 1 having a screen gain G of 0.22, a haze Hz of 48 [%] and a visible light transmittance of 46 [%] as shown in FIGS. 2A, 2B and 2C was prepared. The assumed vehicle external environment is the same as in Ex. 1, except that the illuminance I outside the car was set to be from 20 to 12,000 [lx]. Further, the range of illuminance B of the projector, etc. are also the same as in the case of Ex. 1.

In Ex. 3, the haze Hz was relatively large, whereby the visibility from inside the car (the visibility of the scene, etc. outside the car for the observer 201) was not good in each of (1) to (14). In a case where the visibility parameter was at most 3.9 (in the case of (1) to (8)), halation was not noticeable. On the other hand, in (3) to (14), the value of the visibility parameter was at least −1.5, whereby the visibility from outside the car was high. By having the visibility parameter of from −1.5 to 3.9 ((3) to (8)), it was possible to obtain a video image display system in which halation was suppressed while the visibility from outside the car was maintained.

In each of Ex. 1 to 3, by setting the visibility parameter to be within the range of the formula 1, it was possible to realize a video image display system in which halation was suppressed while the visibility from outside the car was maintained. The lower limit value of the visibility parameter is preferably at least −1.4, and the upper limit value of the visibility parameter is preferably at most 3.7.

Embodiment 2

Figure 3:
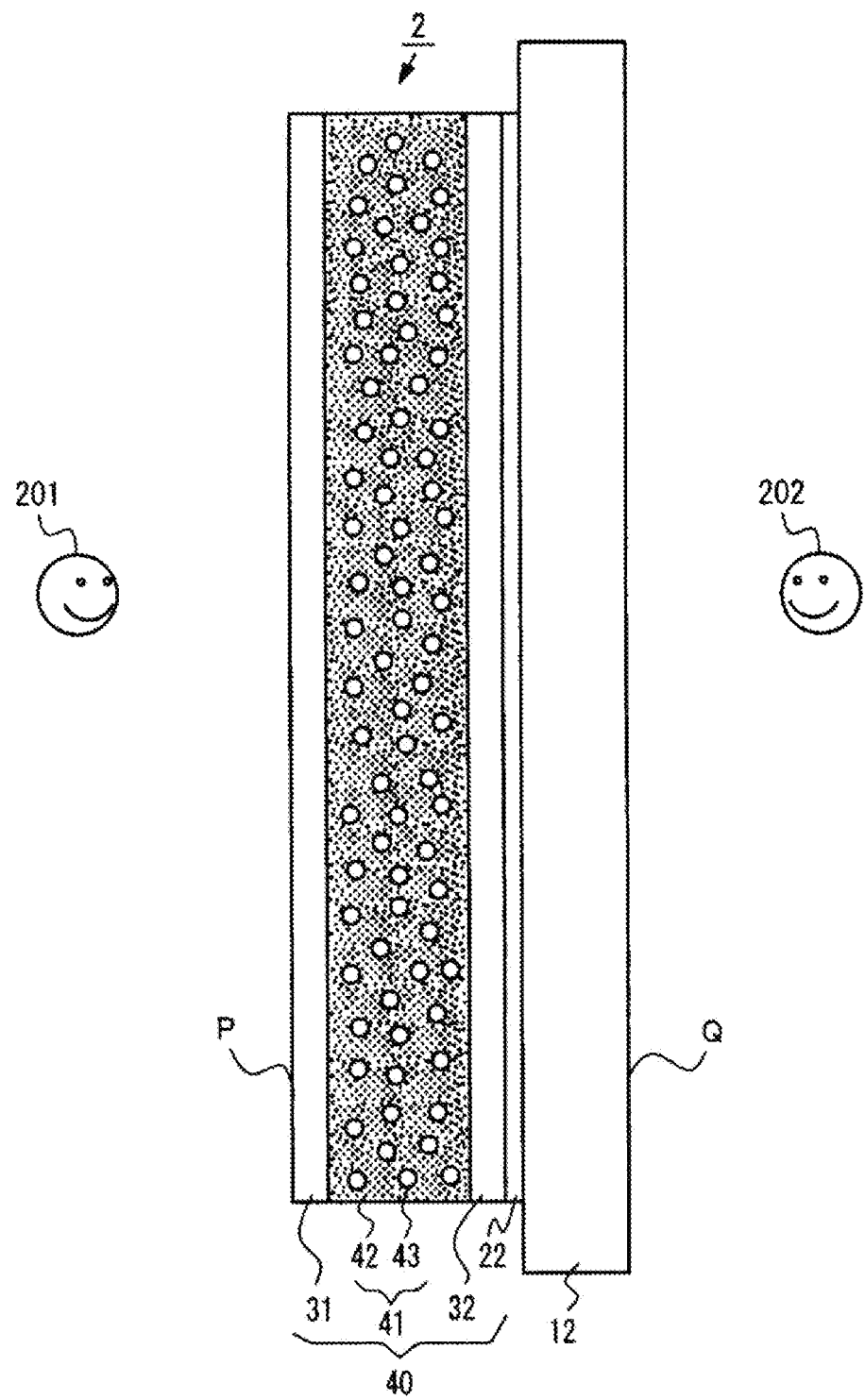
FIG. 3 is a cross-sectional view showing another transmissive transparent screen.

FIG. 3 is a cross-sectional view of the transmissive transparent screen in the video image display system of the second embodiment. The video image display system comprises a transmissive transparent screen 2 and a projection device (not shown).

The transmissive transparent screen 2 comprises a second transparent substrate 12 and a light scattering sheet 40. The second transparent substrate 12 and the light scattering sheet 40 are bonded by the second bonding layer 22.

The transmissive transparent screen 2 transmits the scene on the first surface P side to be visible to the observer 202 on the second surface Q side. The transmissive transparent screen 2 transmits the view on the second surface Q side to be visible to the observer 201 on the first surface P side. Further, the transmissive transparent screen 2 displays the video image light projected from the first surface P side to be visible as a video image to the observer on the second surface side.

The transmissive transparent screen 2 corresponds to one having the first transparent substrate 11 removed from the transmissive transparent screen 1 of the first embodiment. As an application example of the transmissive transparent screen 2, there may, for example, be a case where the second transparent substrate 12 is an existing window glass or the like. That is, an application example in which the light scattering sheet 40 is attached to an existing window glass, etc., is assumed.

Further, it is also possible to form a transmissive transparent screen in which the second transparent substrate 12 is removed from the transmissive transparent screen 1 of the first embodiment.

Embodiment 3

Figure 4:
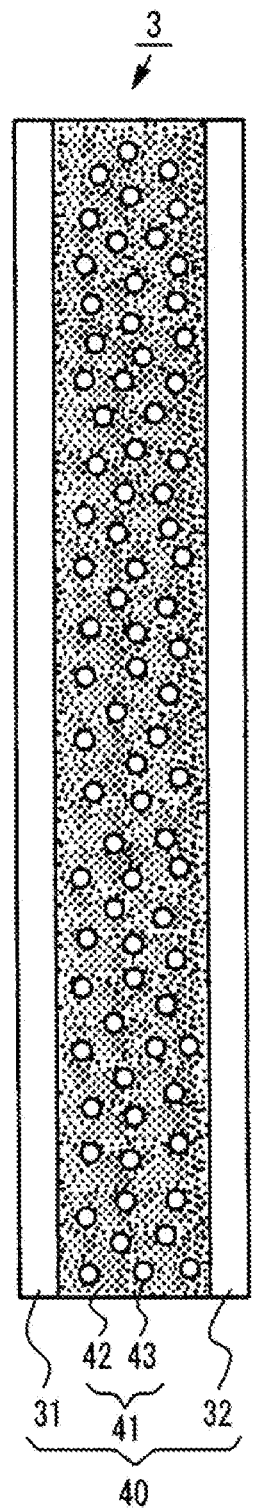
FIG. 4 is a cross-sectional view showing yet another transmissive transparent screen.

FIG. 4 is a cross-sectional view of the transmissive transparent screen in the video image display system of the third embodiment. The video image display system comprises a transmissive transparent screen 3 and a projection device (not shown).

The transmissive transparent screen 3 corresponds to one having the first transparent substrate 11 and the second transparent substrate 12 removed from the transmissive transparent screen 1 of the first embodiment. The transmissive transparent screen 3 can be attached to an existing window glass or the like by using an adhesive layer.

Application Example 1

Figure 5A:
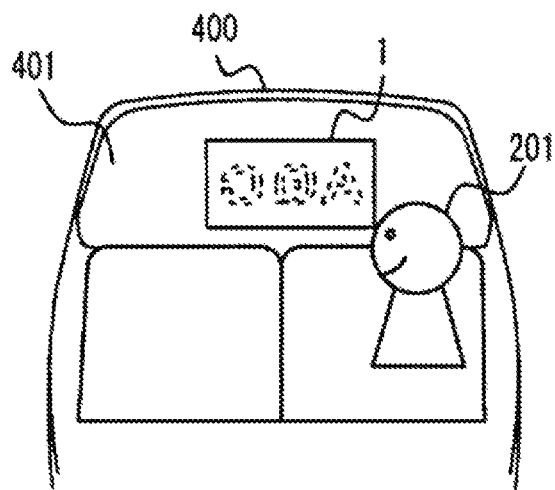
FIG. 5A is an illustrative view showing an application example of the video image display system, and shows the state inside of the passenger car.
Figure 5B:
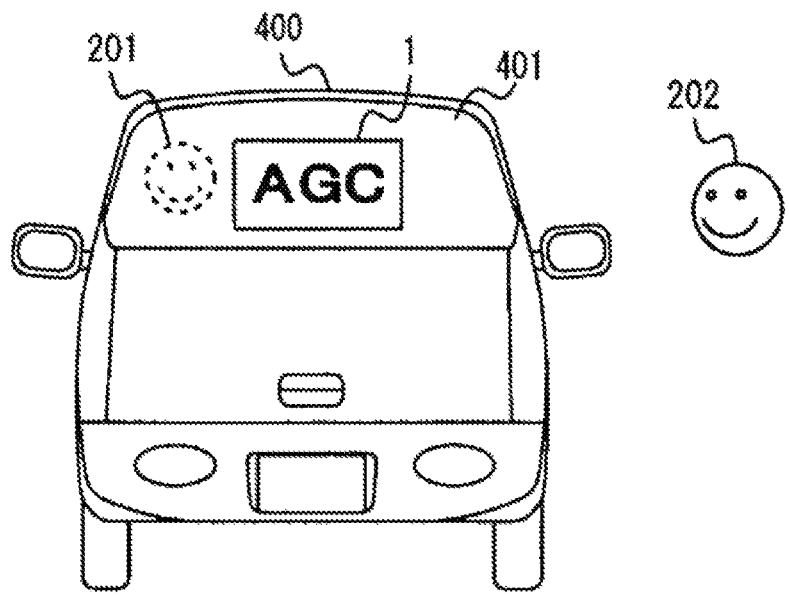
FIG. 5B is an illustrative view showing an application example of the video image display system, and shows the state having the passenger car viewed from the rear of the passenger car.

Next, an application example of the transmissive transparent screen 1 will be described. FIG. 5 shows an example where the transmissive transparent screen 1 is applied to the rear window 401 of a passenger car 400. FIG. 5(A) shows the state inside of the passenger car 400. FIG. 5(B) shows the state having the passenger car 400 viewed from the rear of the passenger car 400. Here, it is illustrated that the transmissive transparent screen 1 is applied to the rear window 401 of the passenger car 400, but it may be installed on a window other than the rear window 401, such as a rear door glass, a rear quarter glass, a front door glass, a roof or a windshield.

As described above, in the off state of the projection device (not shown) installed in the car, the visibility of the external scene for the observer 201 is good. That is, the observer 201 can view the external scene (outside the transmissive transparent screen) through the rear window 401 with good visibility in daytime, etc.

Further, as described above, the visibility of the video image for the observer 202 is good in the on state (the state of projecting video image light) of the projection device installed in the car. That is, the observer 202 can view the video image on the transmissive transparent screen 1 with good visibility at night, etc.

Application Example 2

Figure 6:
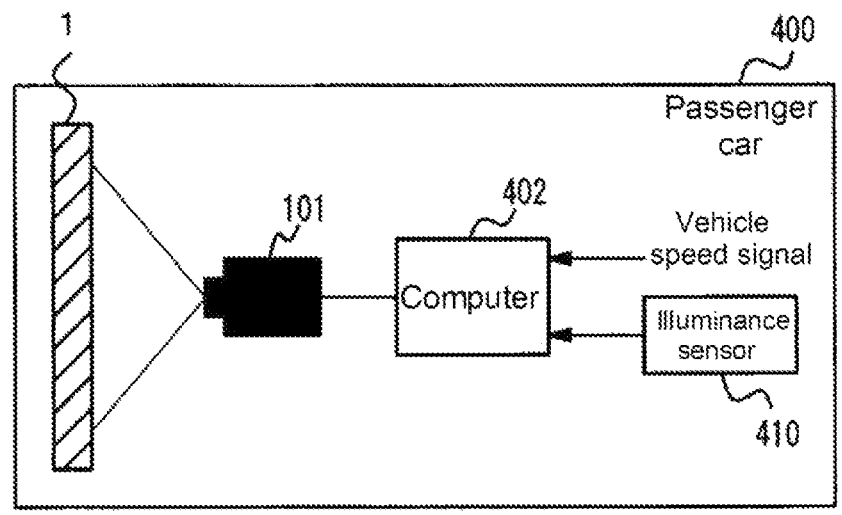
FIG. 6 is a system construction diagram showing another application example of the video image display system.

FIG. 6 is a system construction diagram showing another application example of a video image display system. In the example shown in FIG. 6, the video image display system is installed in a passenger car 400, which is an example of a vehicle. The transmissive transparent screen 1 is installed, for example, in the rear window 401 of the passenger car 400. The projector 101, as an example of the projection device 100, is connected to an on-board computer 402. The computer 402 may be an engine control unit (ECU) or a retrofit computer (e.g. a single board computer).

In a vehicle-mounted application, it is desirable that the projector 101 be small size and light weight. For example, it is preferred that the weight of the projector 101 is at most 3 kg. The desirability of small size and light weight is not limited to the case where the projector is mounted on a vehicle, but also applies to a case where the projector is installed in a relatively small area other than a vehicle.

Further, it is also preferred that the projection distance of the projector 101 is at most 100 cm, since it becomes possible that the projector 101 be mounted in a small area such as a vehicle.

In Application Example 2, an illuminance sensor 410 is installed in a passenger car 400. The illuminance sensor 410 is installed at a position where at least the illuminance outside the vehicle can be detected. Further, a vehicle speed signal is input to the computer 402 from the axle of the passenger car 400.

The computer 402 is able to ascertain the speed (moving speed) of the passenger car 400 based on the vehicle speed signal. When the computer 402 detects, based on the speed of the passenger car 400, that the passenger car 400 has stopped, the computer 402 instructs the projector 101 to start projecting a video image. When the speed of the passenger car 400 becomes at least a predetermined value, the computer 402 instructs the projector 101 to terminate the projection of the video image. The predetermined value is, for example, from 1 to 30 km/h.

If the computer 402 is capable of inputting information on the speed of the passenger car 400 other than the vehicle speed signal, the computer 402 may use such information. If the passenger car 400 is equipped with a GPS function, the speed of the passenger car 400 may be calculated from the location information of the passenger car 400 based on the GPS function as information other than the vehicle speed signal.

Further, when the illuminance outside the vehicle detected by the illuminance sensor 410 becomes to be at most a predetermined value, the computer 402 instructs the projector 101 to start projecting the video image. Further, when the illuminance exceeds the predetermined value, the computer 402 instructs the projector 101 to terminate the projection of the video image. The predetermined value is, for example, from 1 to 500 lx.

In a case where it is desired to easily control the start/end of video image projection according to the brightness outside the car, a method may be used in which the computer is inputted with the time of sunset, sunrise, etc. in advance and controls the start/end of the projection based on the predetermined time. Otherwise, it is also possible to control the start/end of the projection by interlocking it with the headlamp auto light signal or small light signal.

Here, the computer 402 may conduct the control of the start/end of projection of the projector 101 based on the speed of the passenger car 400 and the control of the start/end of projection of the projector 101 based on the illuminance, but it may conduct only one of them.

In a case where it is so constructed that to the computer 402, information on the ignition key or information of the push button for starting the engine can be input, the computer 402 may be made to conduct the control the projection start of the projector 101 on the condition that the ignition key is turned on (e.g. the engine start state or the accessory power on state), or the turned on state is made by the push button. Further, the computer 402 may be made to terminate the projection of the projector 101 when the ignition key is turned to the off state (e.g. the engine stop state or the accessory power off state) or the turned off state is made by the push button. Here, the accessory power on state is a state in which the power is supplied from the accessory power source.

Application Example 3

Figure 7:
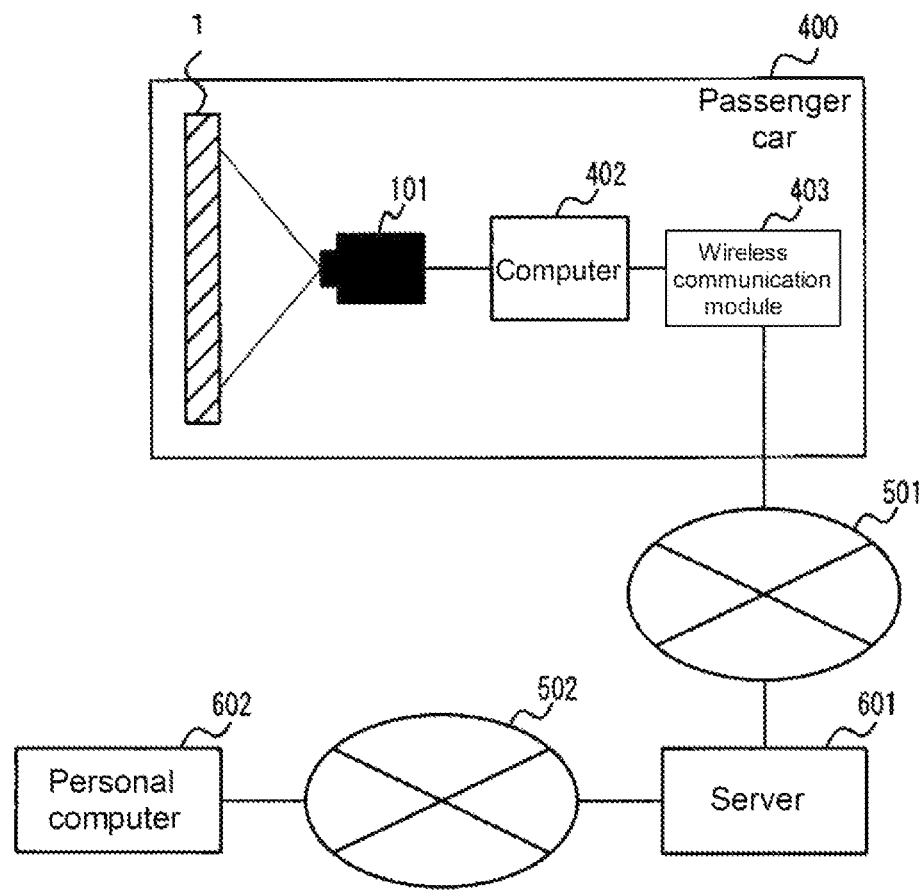
FIG. 7 is a system construction diagram showing yet another application example of the video image display system.
Figure 8:
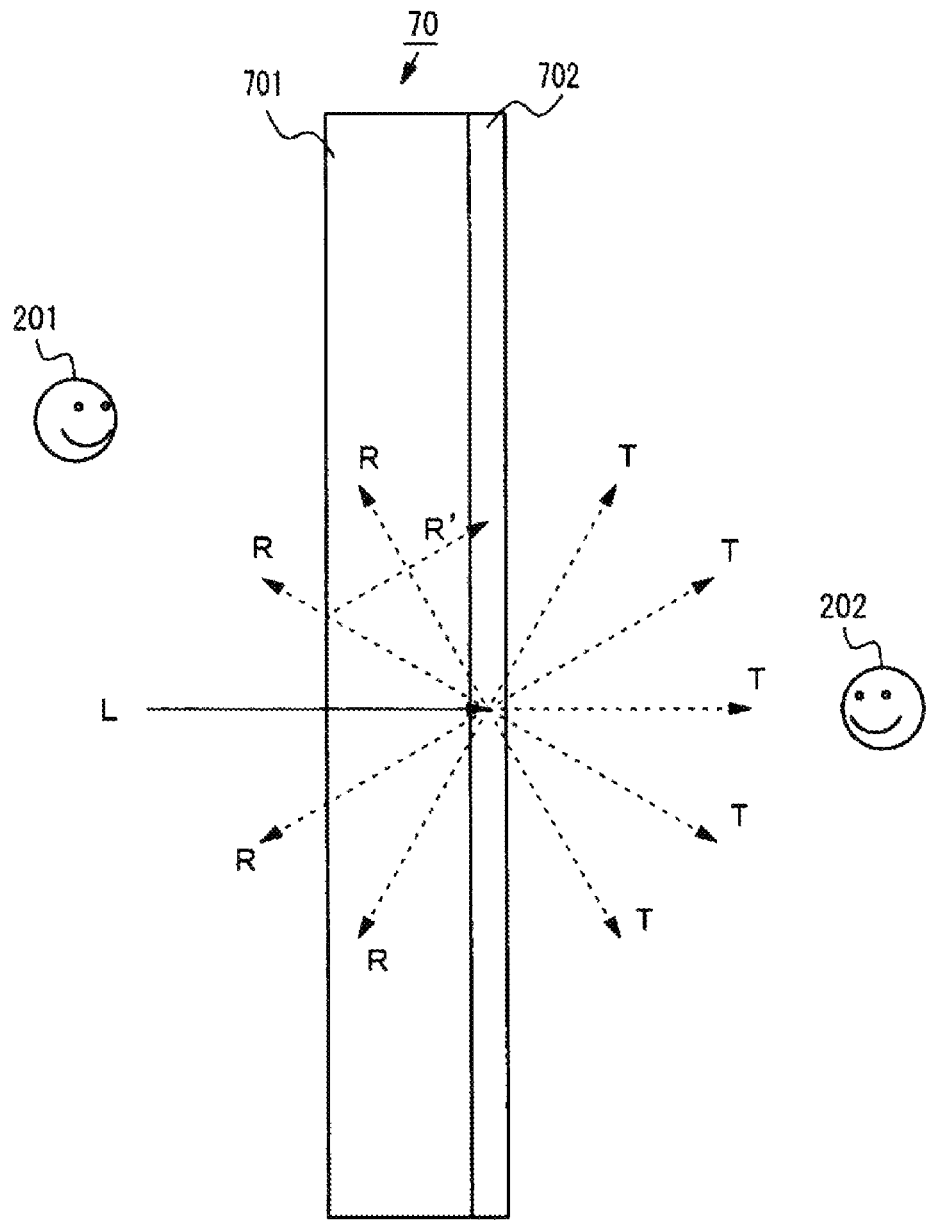
FIG. 8 is a cross-sectional view showing an example of a conventional transmissive transparent screen.

FIG. 7 is a system construction diagram showing yet another application example of the video image display system. In the example shown in FIG. 7, a transmissive transparent screen 1 is installed, for example, in the rear window of a passenger car 400. A projector 101, as an example of a projection device 100, is connected to an on-board computer 402. The computer 402 may be an engine control unit (ECU). Application Example 3 is applied to a passenger car 400 in which a wireless communication module 403 is installed. Further, the wireless communication module 403 has a GPS function.

The GPS antenna and receiver may be integrated with the wireless communication module 403 or separate from the wireless communication module 403, and may be connected via USB, etc.

In Application Example 3, the video image display system further includes a wireless communication network 501 and a server 601. As the wireless communication network system, 3G, 4G (LTE), or 5G, may be exemplified. The wireless communication module 403 is electrically connected to the computer 402 and can communicate with the server 601 via the wireless communication network 501. That is, the server 601 is a server in a cloud environment (cloud server). The server 601 stores multiple types of video image data.

The server 601 can communicate with a computer (in this example, a personal computer 602) via the internet 502. The personal computer 602 uploads video data to the server 601 via the internet 502.

When the accessory power source is turned on, the computer 402 requests video data from the server 601 via the wireless communication module 403. In response to the request, the server 601 supplies the video data to the computer 402 via the wireless communication network 501 and the wireless communication module 403. The computer 402 provides the video data to the projector 101. The projector 101 projects a video image based on the video image data onto the transmissive transparent screen 1.

At the time of downloading the video data from the server 601 to the computer 402, it may take such a form that the video data stored in the computer 402 may all be overwritten in advance, or it may take such a form that only the difference between the video data stored in advance and the new video data uploaded to the server 601 may be downloaded.

Further, the projector 101, the computer 402 and the wireless communication module 403 may not necessarily be required to be linked to the accessory power source, and may be directly connected to the vehicle's battery.

Since the wireless communication module 403 has a GPS function, the computer 402 can determine the location of the passenger car 400 via the wireless communication module 403. Therefore, the computer 402 can be used to display a video image suitable for the position of the passenger car 400 on the transmissive transparent screen 1. For example, the computer 402 is set up with data corresponding to predetermined position ranges and types of video images in advance. Further, in the server 601, video data of video images corresponding to the respective position ranges are uploaded and stored in advance, for example, from a personal computer 602. And, when the computer 402 detects that the position of the passenger car 400 corresponds to a video image different from the currently displayed video image, it requests the server 601 to supply a different video image. The computer 402 causes the projector 101 to project an image based on the new video image data supplied by the server 601 in response to the request.

Further, in a case where the passenger car 400 is equipped with a wireless communication module 403 having a GPS function, the computer 402 can use the GPS function of the wireless communication module 403 to perform the detection of the speed of the passenger car 400 in the above-mentioned Application Example 2.

This application is a continuation of PCT Application No. PCT/JP2020/032230, filed on Aug. 26, 2020, which is based upon and claims the benefit of priority from Japanese Patent Application No. 2019-156656 filed on Aug. 29, 2019. The contents of those applications are incorporated herein by reference in their entireties.

REFERENCE SYMBOLS

1, 2, 3: Transmissive transparent screen (transparent screen)
11: First transparent substrate
12: Second transparent substrate
21: First bonding layer
22: Second bonding layer
31: First transparent film
32: Second transparent film
40: Light scattering sheet
41: Light scattering layer
42: Transparent resin
43: Light scattering material
100: Projection device
101: Projector
201, 202: Observer
400: Passenger car
401: Rear window
402: Computer
403: Wireless communication module
410: Illuminance sensor
501: Wireless communication network
502: Internet
601: Server
602: Personal computer

What is claimed is:

1. A video image display system comprising:
a projection device; and
a transmissive transparent screen having a first surface and a second surface on the opposite side of the first surface, having a visible light transmittance of at least 5 [%], and displaying video images projected from the projection device installed on a side of the first surface as video images visible to an observer on a side of the second surface,
wherein said video image display system satisfying Formula 1:

$$-1.5<\ln(((B/A)/I)\times G)<3.9 \qquad \text{Formula 1}$$

in the Formula 1, A is the projection area [m$^2$] of the projection device, B is the luminous flux [lm] projected onto A by the projection device, I is the ambient illuminance [lx] at the side of the second surface, and G is the screen gain of the transmissive transparent screen, wherein the transmissive transparent screen comprises a first transparent substrate provided on the side of the first surface, and a second transparent substrate provided on the side of the second surface, wherein the second transparent substrate is gray, which is uniform throughout an entire visible light of 0.25<x<0.4, 0.25<y<0.4 in xyY color system.

2. The video image display system according to claim 1, wherein the projection device has a luminance adjustment function.

3. The video image display system according to claim 1, wherein the haze Hz of the transmissive transparent screen is at most 30 [%].

4. The video image display system according to claim 1, wherein the screen gain G is at least 0.05.

5. The video image display system according to claim 1, wherein the transmissive transparent screen is equipped with a light control layer in which the screen gain G and the haze Hz change between a first state in which light is scattered and a second state in which light is transmitted, and the screen gain G is at least 0.05 in the first state and the haze Hz is at most 30 [%] the second state.

6. The video image display system according to claim 1, wherein:
the transmissive transparent screen further comprises a light scattering sheet,
the first transparent substrate and the light scattering sheet are bonded by a first bonding layer, and
the second transparent substrate and the light scattering sheet are bonded by a second bonding layer.

7. The video image display system according to claim 1, wherein the thickness of the transmissive transparent screen is at most 6 [mm].

8. The video image display system according to claim 1, wherein the projection device is a projector, and the projection distance is at most 100 [cm].

9. The video image display system according to claim 1, wherein the weight of the projection device is at most 3 [kg].

10. The video image display system according to claim 1, which is provided with a sensor to detect the ambient illuminance I.

11. The video image display system according to claim 10, wherein the video projection starts when the ambient illuminance I becomes at most a predetermined value, and the video projection terminates when the ambient illuminance I exceeds the predetermined value.

12. The video image display system according to claim 11, wherein the predetermined value is from 1 to 500 [lx].

13. The video image display system according to claim 1, wherein the transmissive transparent screen is installed on a window of a vehicle.

14. The video image display system according to claim 13, wherein the video projection starts when the vehicle comes to a stop, and the video projection terminates when the vehicle's moving speed becomes to be at least a predetermined value.

15. The video image display system according to claim 14, wherein the predetermined value is from 1 to 30 [km/hr].

16. The video image display system according to claim 13, which is further equipped with a cloud server that stores video data and a communication module that is connected to the projection device and transmits and receives video data from the cloud server,
- the projection device and the communication module are electrically connected to each other, and
- the communication module acquires the video data from the cloud server at the timing when the power supply from an accessory power source of the vehicle is started.

17. The video image display system according to claim 16, wherein the communication module is equipped with a GPS function,
- the video image data corresponding to a plurality of location ranges are stored in the cloud server, and
- the video image corresponding to location information identified by the GPS function is displayed on the transmissive transparent screen.

* * * * *